United States Patent Office 3,389,974
Patented June 25, 1968

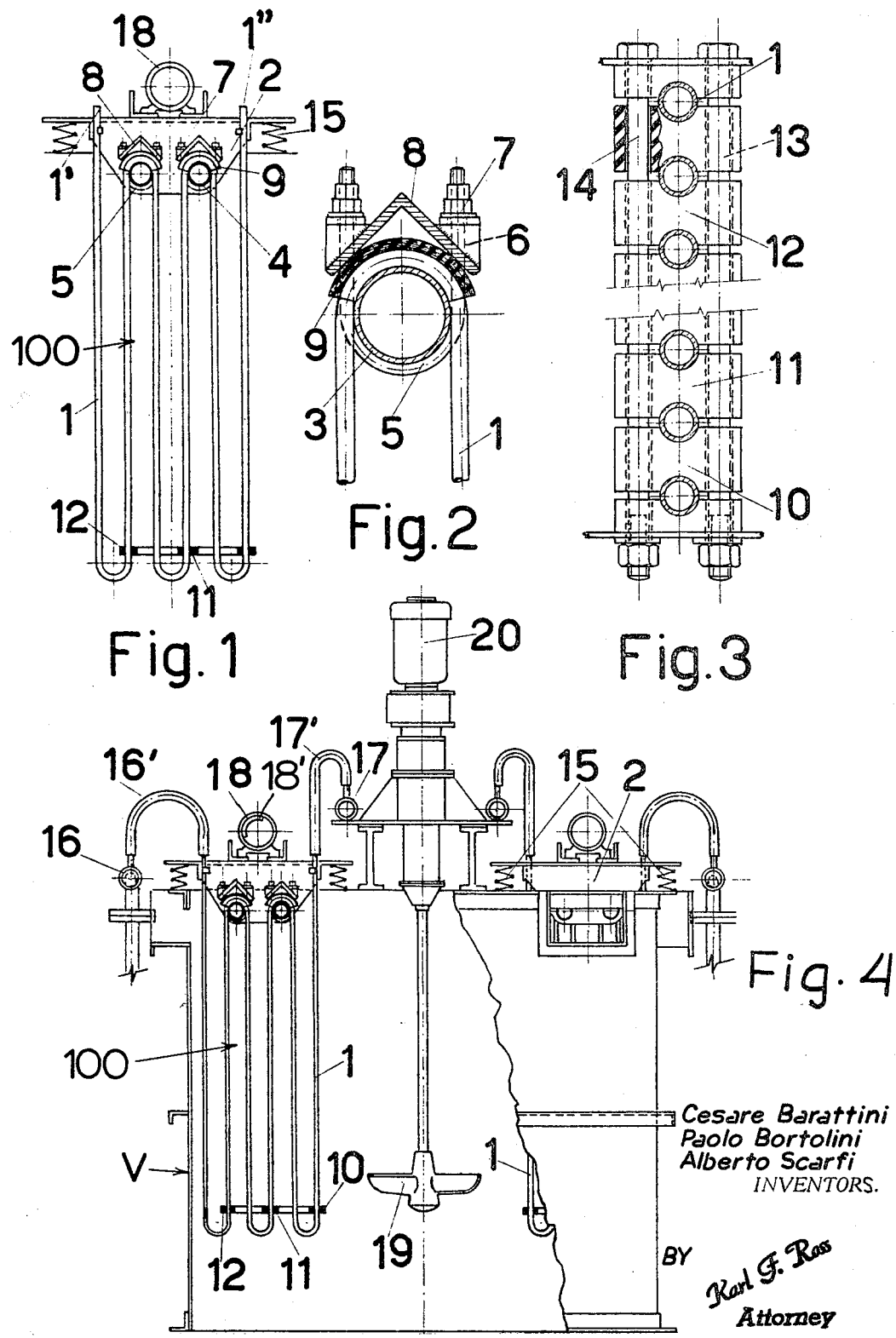

3,389,974
PROCESS AND APPARATUS FOR
HARVESTING CRYSTALS
Cesare Barattini, Siracusa, Paolo Bortolini, Milan, and Alberto Scarfi, Siracusa, Italy, assignors to Montecatini Edison S.p.A., Milan, Italy
Filed June 10, 1965, Ser. No. 462,914
Claims priority, application Italy, June 10, 1964, 12,698/64
4 Claims. (Cl. 23—295)

ABSTRACT OF THE DISCLOSURE

System for recovering inorganic salt crystals from a hot mother liquor containing the salt wherein the mother liquor is passed rapidly into heat-exchange contact with a multiplicity of tubes of undulating configuration and closely spaced U-shaped turns with relatively long vertical passes and relatively short spacing between the passes, a coolant passing through these tubes, the tubes being vibrated relatively to the vessel upon which they are suspended and independently of the stirring of the solution to prevent adhesion of crystal growth to the tubes.

---

Our invention relates to an improved process for recovering crystals from cooled saturated mother liquors. More specifically, this invention relates to processes whereby the mother liquors are cooled to yield the crystals by means of heat exchangers in such manner as to avoid incrustation of the heat-exchanger surfaces by a scale from the brine being treated.

The classic methods of obtaining crystals from mother liquors depend on either the cooling of the liquors or the evaporation of the solvent. In either case, the solubility product of the crystal-forming solid in the solvent is exceeded and crystallization commences. Crystal size and type are influenced by the rate of change of solubility, by the degree of agitation, and by the physical nature of the solid itself.

Crystals, especially of inorganic salts, have been industrially harvested by the cooling of saturated mother liquors. Difficulties, however, are encountered which virtually prevent the use of conventional surface-type heat exchangers as cooling means. The contacting of the mother liquor with the relatively cold walls of the heat exchanger initiates a precipitation of the salt thereon, leading to the formation of scale by the salts on the heat-exchanging surfaces. This scale formation continues until the amassed incrustation retards heat flow through the exchanger, thereby substantially halting the thermal flux and nullifying the purpose of the exchanger.

The prior art shows that attempts have been made to solve this problem by several expedients. One such expedient has been to increase the rate of flow of the mother liquor past the heat exchanger. It was believed that the turbulence of the liquid and the abrasive action of the precipitated solids would prevent adherence of the crystals to the cooling surfaces or would, at least, remove any crystals that might adhere. In practice, however, such a solution to the dilemma introduced more problems than it solved: the surface areas of the exchangers had to be inordinately enlarged to maintain efficient heat exchange under conditions of high turbulence; the energy consumption of pumps and agitators to maintain the flow and turbulence was uneconomical; the crystals had a tendency to build up in areas where the flow-rate was insufficient; and the abrasive action was often too efficient, causing stress corrosion and deterioration of the surfaces of the exchanger. Both of the latter difficulties resulted in contamination by the substances eroded from the heat exchanger of the brine and often, when erosion proceeded too far, contamination by the coolant itself.

Further known systems for avoiding the scale formation utilized cooling pipes provided with special scraping screws. However, such devices are very expensive and complex and their use is justified only in special cases.

Other such systems have also been tested, but generally, for industrial purposes, the indirect cooling by means of exchangers is not favored and recourse is made to cooling by evaporation.

This technique when applied industrially utilizes sets of evaporators in series (cooling stages) with progressively increasing vacuum, each stage being provided with condensers for removing the solvent vapors. Moreover, batteries of vacuum pumps are needed, in addition to stirrers, vapor ejectors, etc. The equipment needed for efficient operation of such a system is often so complex that decisions balancing the efficiency against economy can only be made by computers.

An object of the present invention is to provide an improved industrial process and related equipment for recovering salt crystals from mother liquors to cause cooling.

Another object is to provide a practical and economic heat-exchanger arrangement for industrially harvesting crystals from mother liquors.

A further object of our invention is to achieve crystalization of inorganic salts in the form of large crystals in a thermal-exchange system that is efficient and reproducible.

These and other objects, which will become apparent, are effectively attained through the improved crystallization process according to the invention, which is based on the principle of passing the mother liquor in heat-exchanging relationship with heat-exchanger ducts containing the circulating coolant; the exchangers are, according to the invention, mounted so as to be vibrated at sonic or ultrasonic frequencies. and are provided with appropriate vibrating means for the purpose. The frequency, intensity and duration of the vibrations are selected so as to prevent adherence of the crystals to the cooling surfaces of the tubes and to prevent growth of crystalline aggregates upon the cooled surfaces of the tubing or its supports. The vibrations need be applied only to those portions of the exchangers that are in contact with the mother liquor or with the resultant slurry.

The invention, in its apparatus aspects, employs immersion-type heat exchangers provided with sources of vibratory power extending into a bath of the saturated solution contained in a vessel. The vessel may also be provided with means for the agitation or circulation of the mother liquor with respect to the heat-exchange surfaces.

The exchanger is preferably a tube-bundle heat exchanger through which a coolant is forced. The tubes have smooth external surfaces in contact with the mother liquor or can be provided with fins or other surface formations adapted to increase the heat-exchange surface area. A smooth surface is preferred for the tube exchangers as the cost of such exchangers is lower and fewer problems are encountered with metal fatigue of the fin junctions when such joints are exposed to vibration-induced stresses. When broad-surfaced exchangers are used, it is expedient to utilize surface formations in order to achieve greater heat-exchange surface areas.

In mounting the heat exchanger in the vessel, it is preferred to utilize resilient members at some point in the mounting in order to permit the longitudinal vibration of the heat-exchange elements to restrict the vibration to the exchanger, and to damp stray vibrations which might damage the large vessel.

The vibrations are imparted to the exchanger by any of the conventional vibration-inducing devices including motor-driven eccentrics, unbalanced flywheels, percussion devices, magnetic vibrators, and electronic oscillators in the range of audible frequencies. Ultrasonic transducers are used at the higher frequencies. These latter include crystal transducers, magneto-strictive devices and the like.

The damping devices for localizing the vibrations may include multispring dampers, hydraulic or pneumatic dampers, resilient packings or simply the use of flexible mounts. These latter include rubber tubing or metal tubing with bights or free-standing bends, preferably in S or U form. The tubing which is needed for supplying the coolant to the exchanger via a flexible joint, may also include bellows sections. These, too, will effectively damp the transmission of vibrations from the heat exchanger to the vessel.

The invention will be described in detail below with respect to a simple yet preferred embodiment, the general principles being set forth with reference to the accompanying drawing in which:

FIG. 1 is an elevational view, somewhat schematically illustrating a tube-bundle heat exchanger according to the invention;

FIGS. 2 and 3 are fragmentary cross-sectional detail views of the tube bundle; and FIG. 4 is an elevational view, partly broken away, showing a pair of tube bundles of the type shown in FIG. 1, mounted in a vessel for the mother liquor.

The apparatus shown in the drawing for carrying out the crystallization process of this invention consists of a set of pipes 1, through which a coolant fluid is passed; each of said pipes is bent one or several times into U-shape so as to form a compact bundle or bank of undulating tubes.

The upper portion of the tube bundle is supported by a frame 2 and firmly locked in place by positioning the bight portions or arcuate zones of the tubes around large transverse support pipes 3, 4 which are horizontally fastened to the frame 2, and clamping the tubes by means of U-shaped stays 5 and nuts 7 against an angle support bar 8 through which the shanks 6 of the stays 5 extend. Between the angle bar 8 and the upper bight portions of the tubes 1, elastic spacers 9 (FIG. 2) of rubber or the like are interposed.

The various tubes 1, whose lower ends are immersed in the mother liquor, are fastened with respect to each other (FIG. 3) by interposing between them blocks 10, 11, 12 etc. of elastic material (rubber or like elastomer) and clamping them into fixed relationship by means of longitudinal stay rods 13, 14.

The tube-bundle assembly 100 is immersed in the mother liquor over almost its entire length and the frame 2 is mounted, by compression springs 15 (FIGS. 1 and 4) to the upper surface of the vessel V. The inlet and outlet manifolds 16, 17 of the coolant fluid are connected to the ends 1' and 1" of the tubes by means of flexible conduits 16' and 17' (FIG. 4), generally of rubber, so as to permit vibration, prevent transmission thereof to the vessel V and prevent mechanical stresses at the connections.

The vibrations which, according to the invention, prevent the formation of scales on the cooled pipes are provided by means of an electric motor 18 with an eccentric weight 18', rigidly mounted on frame 2 and suited for imparting the desired vibrations to this latter and to the whole tube bundle which it supports.

In practice it has been found that through the above-described vibration device the surfaces of the pipes are kept free from scales and the thermal exchange of the device is kept unchanged during extended operation. Probably this results from the intense turbulence caused by the vibrations in the immediate vicinity of the pipe surfaces; this turbulence causes a rapid renewal of the liquid film at the pipe surfaces and, while encouraging the rapid formation thereupon of crystallization nuclei by cooling, limits the period of growth of such nuclei so that they cannot adhere to the exchanger. The rest of the crystal growth takes place at less agitated regions of the mother liquor.

It has furthermore been ascertained that the coefficient of thermal convection can be increased by 100% by converting from a nonvibrating exchanger to a vibrating exchanger. With short vibration periods followed by quiet intervals, the cleaning of the tube surfaces may also be obtained, although with a reduced transmission coefficient, provided that the rest time between vibration periods is not so long as to allow the crystalline aggregates to become firmly anchored to the cold tubes and to occlude the heat exchanger.

A practical utilization of the exchangers of this invention is found in the removal of the heat of reaction between two or more crystalline species from a salt slurry.

In such cases, since a time for crystal growth must be allowed (or a time for the completion of the reaction), a set of large vessels for the slurry is arranged to cause overflow from one vessel to another, under constant stirring by suitable stirrers to prevent settlement of the solids. The exchangers according to the invention (one or more in number) are merely immersed in the vessels and crystal harvesting is initiated. To achieve good thermal exchange, it is preferred that a rotary motion is induced by the stirrers to renew continually the cold mother liquor and resultant slurry in contact with the exchangers.

In cases requiring only the cooling of the slurry without regard to crystal size or in cases in which it is desired to cool the slurry as rapidly as possible in order to avoid undesired reactions, the exchangers, according to the invention, can be arranged in pairs and immersed in vessels of substantially rectangular type. A vigorous stirrer 19 with vertical thrust, actuated by a motor 20, constantly renews the fluid contacting the exchangers so as to maintain the bath nearly isothermal in all places (FIG. 4). Such apparatuses (vessels with pairs of exchangers) may be connected in series in two parallel rows with the slurry overflowing from one vessel to the next according to an ideal broken line of "Greek fret" configuration. This particular kind of connection has proved to be very useful inasmuch as it enables, at every moment, any one of the set of vessels to be removed from the line for recovery of the solids from the slurry by filtration or other means.

The advantages offered by the above-described equipments and installations with respect to the conventional systems for cooling of mother liquor and slurries and crystallizing by evaporation includes vapor saving, energy saving, and "house-keeping" economy.

Below an example of the use of the process of this invention with an exchanger according to the invention is given by way of illustration but not limitation, with reference to an industrial plant for producing potassium sulfate from kainite ore.

EXAMPLE

An exchanger of the type indicated in FIG. 1 is made up of a bundle of 20 tubes and with inner diameter of 17 mm., outer diameter of 20 mm., and a total surface area of 16 sq. m. The frame, to which the upper loops of the tubes are fastened, carried a vibrator of 0.5 kw. output at 50 c.p.s. (3000 r.p.m.).

The exchanger assembly is positioned by means of four springs (15 in FIG. 4) on longitudinal members fastened to the edge of the conditioner vessel so as to immerse the tubes for almost their entire length in the slurry.

The conditioner vessel is a vat (height 3000 mm., diameter 3000 mm.) and is provided with an anchor-shaped motor-driven stirrer (25 r.p.m.).

Cooling water is circulated in parallel through the tubes of each exchanger bundle.

The slurry consists of 23.5% solid and 76.5% mother liquor. This mother liquor has a composition by weight of K=2.23%; Mg=5.93%; Na=1.22%; $SO_4$=5.79%; $Cl_2$=16.91%; $H_2O$=67.92%. At a temperature of 25° the solution has a density of 1294 kg./m.$^3$, a viscosity of 5.42 centipoises and a specific heat of 0.645 Cal./kg.° C. The whole slurry has a density of 1420 kg./m.$^3$.

Initially, the slurry has an average temperature of 26.6° C.; for simplicity's sake in calculating the transmission coefficient, the moderate local temperature variations of the slurry within the conditioner are neglected. The temperature of cooling water at the inlet is 15.0° C., whereas the outlet temperature is 23.9° C. Cooling-water flow is 11.8 m.$^3$/h. which corresponds to a velocity of 1.4 m./sec. in the tubes. The heat transfer is 105,000 Cal./hr. The overall transmission coefficient is 1090 Cal./sq. m./hr./° C.

Practically, on an industrial basis, the exchangers according ot the invention may be profitably employed for: Separation of KCl and NaCl from sylvinite ore; purification of raw KCl from 95% to 99.9%; warm leaching of crude carnallite; decomposition of Hartsalz; production of potassium nitrate from $NaNO_3$ and KCl; production of sodium acid carbonate; production of borax; recovery of sodium sulfate from purple ore; production of sodium sulfate from $MgSO_4$ and NaCl; and fractional separation of sodium nitrite and nitrate.

Further, while the preferred mode of operation at present utilizes open-vat vessels as containers for the mother liquors, this invention is not limited thereto since within its ambit is the mounting of vibrating heat exchangers within tube-like vessels used in continuous processes or where the coolant is circulated outside such tube-like vessels and the vessels which are also the heat exchangers are themselves vibrated.

This invention has been described in the light of certain presently preferred aspects but is not limited thereto. All equivalents with regard to conditions or apparatus, while not specifically mentioned, are obviously intended to be included. The invention is only limited by the scope of the appended claims.

We claim:
1. In a process for the production of inorganic-salt crystals from a warm saturated mother liquor containing the salt, the improvement wherein the crystals are precipitated from said mother liquor by passing said mother liquor through a vessel containing a body of the mother liquor in contact with a bank of serially interconnected undulating cooling tubes having a plurality of substantially parallel and vertical passes whose mutual spacing in horizontal direction is only a small fraction of their length; setting said tubes in sustained longitudinal vibrations by bodily oscillating said bank in a vertical direction with reference to said vessel, by contacting said bank with a rotary eccentric, to prevent adhesion and growth of crystals on the tubes; passing a cooling fluid serially through said undulating tubes during vibration thereof; and collecting the crystals from the mother liquor beneath said tubes.

2. The improvement defined in claim 1, including the further step of agitating the mother liquor in said vessel independently of but concurrently with the vibration of said tubes.

3. An apparatus for crystallizing substances from a mother liquor by cooling same, comprising:
   a vessel adapted to contain said mother liquor;
   a bank of undulating cooling tubes having a plurality of substantially parallel and vertical passes whose mutual spacing in horizontal direction is only a small fraction of their vertical length, said tubes extending from above into said vessel and being serially interconnected for the flow of a coolant therethrough;
   suspension means resiliently supporting said tubes on said vessel with freedom of vertical displacement of said bank relative to said vessel;
   rotary eccentric vibrating means on said vessel engaging said bank for continuously oscillating said tubes longitudinally by bodliy reciprocating said bank in a vertical direction with reference to said vessel;
   and circulation means for passing a coolant through said tubes.

4. An apparatus as defined in claim 3, further comprising agitator means independent of said vibrating means in said vessel for stirring said mother liquor in the vicinity of said tubes.

References Cited

UNITED STATES PATENTS

| | | | |
|---|---|---|---|
| 3,248,890 | 5/1966 | Oman | 62—58 |
| 1,276,741 | 3/1919 | Bester | 62—68 |
| 2,028,806 | 1/1936 | Rechtin | 62—68 |
| 2,247,904 | 7/1941 | Brace | 62—68 |
| 2,550,615 | 4/1951 | Stansbury | 62—68 |
| 2,595,968 | 5/1952 | McCoy | 62—68 |
| 2,960,843 | 11/1960 | Zdansky et al. | 62—123 |
| 3,049,888 | 8/1962 | Bosworth | 62—58 |

NORMAN YUDKOFF, *Primary Examiner.*

G. P. HINES, *Assistant Examiner.*